(57.)

NATHAN C. PAGE.

Improvement in Scouring Case for Smut Machines and Hullers.

No. 122,329.　　　　　　　　　　　　　　Patented Jan. 2, 1872.

Witnesses.
C. H. Poole.
J. B. Woodruff

Inventor.
Nathan C. Page 122,329

UNITED STATES PATENT OFFICE.

NATHAN C. PAGE, OF WASHINGTON, DISTRICT OF COLUMBIA.

IMPROVEMENT IN SCOURING-CASES FOR SMUT-MACHINES AND HULLERS.

Specification forming part of Letters Patent No. 122,329, dated January 2, 1872.

SPECIFICATION.

To all whom it may concern:

Be it known that I, NATHAN C. PAGE, of Washington city, in the county of Washington and District of Columbia, have invented a certain new and useful Improvement in Smut-Machines and Rice-Hullers, as a new article of manufacture; and the following is a full, clear, and exact description of the same, reference being had to the accompanying drawing making a part of this specification, in which—

Figure 1:
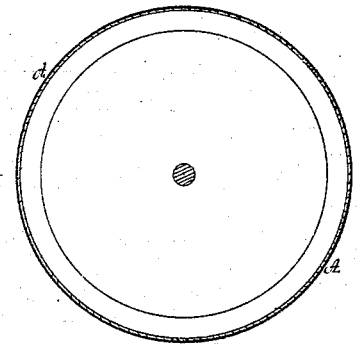
Figure 2:
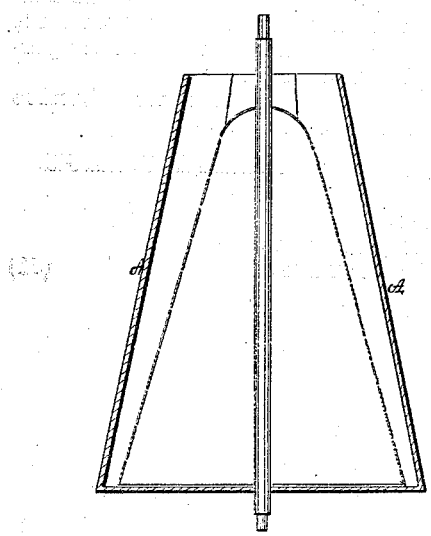
Figure 3:
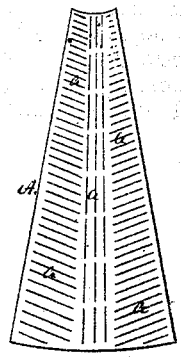

Figure 1 represents the circular base of a cone or cylinder, and casing for the same. Fig. 2 is a vertical section of a revolving cone and cylindrical casing, as shown at X X in Fig. 1. Fig. 3 shows a single section of the perforated conical or cylindrical casing.

My invention consists in making the perforated cylindrical or conical casing which surrounds the rotating cone or beaters, of gritty earthy substances, such as emery, spar, sand, or any other aluminous or silicious material or substances, molded and cast into form suitable for the purpose; my object being to cheapen the cost of construction, and at the same time make them more efficient in their operation, more durable, and easily repaired when worn.

Description by Letters Referring to the Drawing.

The cylindrical casing A may be made in sections, molded and cast with perforations a a a, running vertical, horizontal, or angular. The gritty substance may be mixed with any suitable adhesive substance, and molded in sections to form the casing A. The sections (two, more or less, in number) for forming the whole cylindrical casing, may be secured in position by hoops, bands, or any other suitable mechanical devices, so that should they become worn they can easily be removed from the machine and others substituted.

As a new article of manufacture, I claim—

A grain-securing case or shell, formed of two or more sections, as described, when such sections are composed of emery, spar, sand, or like gritty substances, molded as described, and cast with perforations, as and for the purposes specified and set forth.

In testimony whereof I hereunto subscribe my name in the presence of—

NATHAN C. PAGE.

Witnesses:
CHAS. H. POOLE,
J. B. WOODRUFF.

(51)